Patented Mar. 23, 1926.

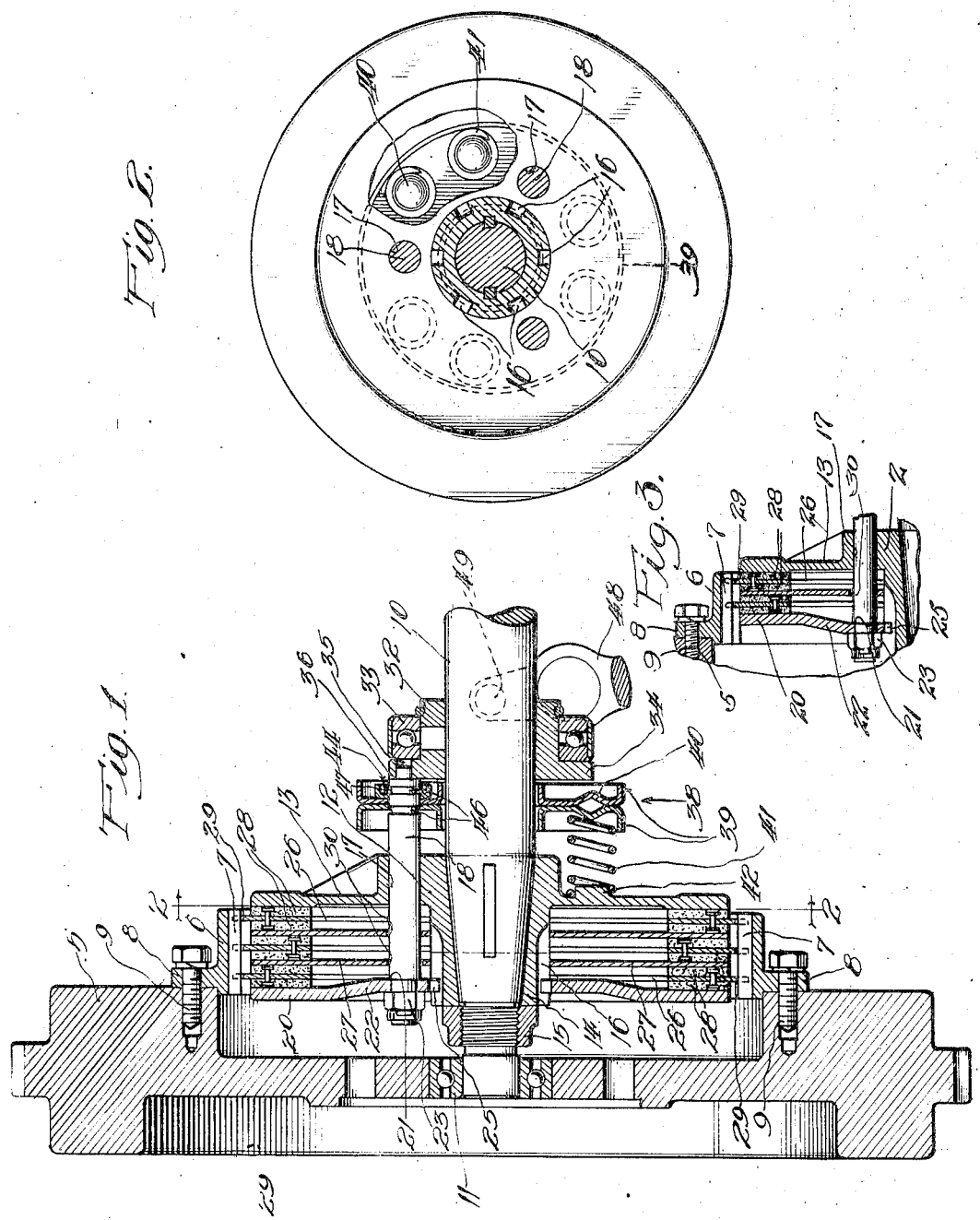

1,577,901

UNITED STATES PATENT OFFICE.

THOMAS L. FAWICK, OF RACINE, WISCONSIN, ASSIGNOR TO TWIN DISC CLUTCH COMPANY, OF RACINE, WISCONSIN, A CORPORATION OF WISCONSIN.

FRICTION CLUTCH.

Application filed December 22, 1921. Serial No. 524,133.

*To all whom it may concern:*

Be it known that I, THOMAS L. FAWICK, a citizen of the United States, residing at Racine, in the county of Racine and State of Wisconsin, have invented certain new and useful Improvements in Friction Clutches, of which the following is a specification.

My invention relates to friction clutches and more particularly to that type known as "multiple disc clutches." The principal object of my invention is to construct a clutch which is simple in operation and construction, highly efficient, durable, cheap to manufacture, and readily repaired. Among other objects of my invention are to construct parts of the clutch so that a variable number of driving and driven plates may be used, as desired, and to provide novel means for adjusting or varying the force or pressure exerted on such plates to normally maintain the clutch in clutched condition. A further object of my invention is to so construct the clutch that the driving and driven plates may be removed or replaced without disassembling the rest of the clutch.

With the above and incidental objects in view, the invention consist in certain novel features of construction and the combination of parts, the essential elements whereof are recited in the appended claims and the preferred form of embodiment of which is described in detail hereinafter and illustrated in full in the accompanying drawings, which form part of this specification.

Of said drawings, Fig. 1 is a section through a clutch, embodying my invention, Fig. 2 is the section taken on the line 2—2 of Fig. 1, and Fig. 3 is a fragmentary section showing the pressure member in its position reverse to that shown in Fig. 2.

The clutch, disclosed for illustrative purposes in the drawings, is particularly adapted for use between the flywheel or crank shaft and the transmission mechanism of motor vehicles, but it is apparent that it may be employed in other relations and in other kinds of machines and I do not intend to limit its application to any particular use.

Referring to the drawings, 5 is a flywheel adapted to be connected to the crank shaft of the engine or to any other suitable shaft. The driving member 6 of the clutch is in the form of a ring, provided with equally-spaced longitudinally-extending lugs or ribs 7 on its inner periphery, and an outwarly extending annular flange 8. The ring 6 is secured to the rear side of the flywheel by means of screws 9 projecting through apertures in the flange 8. The driven shaft 10, which in an automobile would be one of the shafts of the transmission mechanism, is mounted at its forward end in a bearing 11 carried by the flywheel and at its rear end in any suitable bearing (not shown). Keyed on the shaft 10 is a driving member 12, comprising a driven flange or plate 13 and an integral hub 14, which is seated on the tapered portion of the shaft 10 and retained thereon by means of a nut 15. The hub 14 is provided with a plurality of equally-spaced longitudinally-extending grooves 16 and the flange 13 is provided with a plurality of equally-spaced apertures 17, preferably three in number. Projecting through the apertures 17 and slidable therein are rods 18 and mounted on the forward ends of the rods is a pressure plate or disc 20. The rods 18 are provided at their forward ends with reduced portions forming shoulders 21 and the reduced portions project through apertures in laterally pressed-out portions 22 of the disc 20. Nuts 23 on the threaded, reduced portions of the rods 18 maintain the plate thereon. The hub 14 projects through a centeral opening in the pressure disc 20 which is provided with inwardly extending lugs or projections 25 extending into the grooves 16 in the hub.

Mounted between the driven flange 13 and the pressure disc 20 are alternating driving plates 26 and driven plates 27. The driving plates 26 are in the form of flat rings, to which are riveted on each side rings 28 of suitable friction material as is usual in clutches of this general type. The peripheries of the plates 26 are provided with notches 29 into which the ribs on the driving ring 6 project to drive these plates 26. The plates 27 are in the form of discs and are provided with apertures 30 through which the rods 18 project.

Slidably mounted on the shaft 10 is a bearing sleeve 32 which carries a thrust bearing 33. The sleeve 32 has an outwardly extending flange 34 provided with apertures 35 into which the reduced rear ends of the rods 18 project, shoulders 36 on the rods being in engagement with the forward side of the flange 34. Supported on the rods 18 is a device 38 which comprises two sheet metal annular members, plates or rings 39. These members 39, which are alike, are channel-shaped in cross section and arranged back-to-back and may be connected together in any suitable manner. The vertical bases or web portions of the members 39 are provided with pressed-out conical projections 40. The rear coils of coil-springs 41 extend around the projections 40 on the forward member 39 to hold the springs in position. The forward coils of the springs 41 extend about round projections 42 on the back of the driven flange 13. The rear ends of the springs 41 engage only the forward member 39 but the projections 40 are shown on both members because it facilitates production by having the members alike. As will be noted from an inspection of Figure 2, the springs are arranged in pairs between rods 18 and in spaced relation, thereby insuring an equalization of the pressure at all points around the shaft. The rods 18 project through aligned apertures in the members 39 and in sheet metal cup-shaped discs 44 which may be secured to the rear side of the rear ring 39. Each rod 18 is provided with a pair of grooves 46 and a split ring or collar 47 is positioned in one or the other of the grooves. The rear sides of the discs 44 are pressed against the split rings 47.

The usual lever 48 carries studs 49 which cooperate with the pressure sleeve 32 to control the operation of the clutch.

From the above description it is thought that the construction and operation of my invention will be obvious. The springs 41 being compressed between the driven flange 13 and the device 38 tend to move the device and rods 18 rearwardly and thereby normally press the pressure disc 20 against the forward ring 28 on the forward driving plate 26 to maintain the driving and driven plates in driving frictional condition. Upon operation of the lever 48, to release or open the clutch, the sleeve 32 and hence the rods 18 and pressure disc 20 are moved forwardly so that the driving contact between the driven and driving discs is discontinued or broken. In the drawings three driving plates and two driven plates are shown. If desired, one of each of these plates may be eliminated and the pressure disc 20 reversed or turned around on the rods 18, in which case it will then engage the forward friction ring 28 on the forward one of the two remaining driving plates, the pressed-out portions 22 of the pressure disc being provided to accommodate this use of a variable number of driving and driven plates. It is apparent, of course, that any number of driving and driven plates may be employed and I do not intend to limit myself to the number shown in the drawings. The flanges on the discs 44 project around the split rings 47 and thereby positively prevent their accidental or unintentional displacement from the grooves 46 in which they are positioned. If it is desirable to increase the compressive force of the springs 41, the device 38 is moved forwardly on the rods and the split rings are placed in the forward grooves 46, the length of the coil springs 41 being hence reduced.

It will also be observed that the driving and the driven plates may be readily and easily inspected, repaired or replaced without the necessity of disassembling the other clutch parts. To remove a plate, after the clutch in its usual casing has been moved away from the flywheel, it is only necessary to operate the lever 48 to release the pressure exerted on the driving and driven plates by the pressure disc 20 and then remove the nuts 23 and pressure disc 20 to obtain access to the plates 26 and 27. The lever 48 may be held in operated position manually or otherwise. In so removing or replacing a driving or driven plate, it is not necessary to remove or disturb the other parts of the clutch. The nut 15 is smaller in diameter than the central openings in the plates 26 and 27 which permits the latter to be slipped over the nut which remains on the driven shaft. A further important advantage of this feature, aside from the saving of time and elimination of trouble, is that there is no danger of the spring getting free or out of control of the mechanic as is the case with many clutches now on the market, the repair of which subjects the mechanic to serious danger because of the chance of a spring suddenly expanding and causing him injury.

Although I have described but one form of embodiment of my invention, it is to be understood that the invention is susceptible of various changes and modifications, all coming within the scope and spirit of my invention, as defined in the following claims.

I claim:

1. In a clutch, the combination of a plurality of driving and driven plates, a driven member, a pressure disc, and means connecting the driven member and pressure disc, the pressure disc being so shaped that it is reversible on said means to accommodate the use of a variable number of driving and driven plates.

2. In a clutch, the combination of a plurality of driving and driven plates, a driven member, a pressure disc having means projecting to one side of the plane of the same, rods associated with said driven member, and means for connecting the rods to said projecting means, the pressure disc being reversible to accommodate the use of a variable number of driving and driven plates.

3. In a clutch, the combination of a plurality of alternating driving and driven plates, a driven member comprising a hub and a flange, a pressure disc having means projecting to one side of the plane of the same, spring means for exerting a pressure on said pressure disc, and rods projecting through said flange and adapted to be connected to said projecting means on the pressure disc, which pressure disc is reversible to accommodate the use of a variable number of driving and driven plates.

4. In a clutch, the combination of a plurality of alternating driving plates and driven plates, a driven shaft, a member fast on said shaft and comprising a hub and a flange on one side of said plates, a pressure disc on the other side of said plates and having a driving connection with said hub, means on said disc projecting to one side of the plane thereof, rods projecting through said member and having one end connected to said projecting means which project to permit the pressure disc to be reversed for the purpose of accommodating the use of a variable number of driving and driven plates, means associated with the other end of said rods, and spring means between said last mentioned means and flange to cause said pressure disc to exert pressure on said driving and driven plates.

5. In a clutch, the combination of a plurality of alternating driving plates and driven plates, a driven shaft, a member fast on said shaft, rods projecting through said member, a pressure disc on one end of the rods, a device adapted to be adjusted on the other end of the rods, spring means cooperating with said device and rings adapted to be positioned in grooves in said rods.

6. In a clutch, the combination of a plurality of alternating driving plates and driven plates, a driven shaft, a member fast on said shaft, rods projecting through said member, a pressure disc on one end of the rods, a device adapted to be adjusted on the other end of the rods, spring means cooperating with said device, and a sleeve on said shaft having recesses into which one end of each of the rods projects.

7. In a clutch, the combination of a plurality of alternating driving and driven plates, a driven member, rods projecting through the driven member, a pressure disc on one end of said rods, means projecting to one side of said disc, the pressure disc being reversible on the rods to accommodate the use of a variable number of said plates, a device adjacent the other end of said rods and adjustable thereon, and spring means cooperating with said device.

8. In a clutch, the combination of a plurality of alternating driving and driven plates, a driven member, rods projecting through the driven member, a pressure disc on one end of said rods, means projecting to one side of said disc, the pressure disc being reversible on the rods to accommodate the use of a variable number of said plates, a device adjacent the other end of said rods, rings adapted to engage in grooves in said rods whereby the device may be adjusted thereon, and spring means cooperating with said device.

9. In a clutch, the combination of plurality of alternating driving and driven plates, a driven member, rods projecting through the driven member, a pressure disc on one end of said rods, means projecting to one side of said disc, the pressure disc being reversible on the rods to accommodate the use of a variable number of said plates, a device adjacent the other end of said rods and adjustable thereon, spring means cooperating with said device, and an operating sleeve having recesses into which one end of each of said rods projects.

10. In a clutch, the combination of a plurality of driving plates, a driving member having projections extending into recesses in the periphery of said plates, a driven member comprising a flange and a hub having grooves, a pressure disc having projections extending into said grooves, a driven plate between the driving plates, rods projecting through apertures in said member and driven plate and connected at one end to said pressure disc, a device adjacent the other end of said rods, spring means cooperating with said device, and means for operating said rods.

11. In a clutch, the combination of a plurality of driving plates, a driving member having projections extending into recesses in the periphery of said plates, a driven member comprising a flange and a hub having grooves, a pressure disc having projections extending into said grooves, a driven plate between the driving plates, rods projecting through apertures in said member and driven plate and connected at one end to said pressure disc, a device adjacent the other end of said rods, spring means cooperating with said device, a sleeve connected to the last mentioned end of said rods, and means for operating the sleeve.

12. In a clutch, the combination of driving and driven members, a pressure element, rods connected to said element, a device associated with said rods, spring means cooperating with said device, split rings in grooves in said rods, and flanges on said device and around said rings.

13. In a clutch, the combination of driving and driven members, a pressure element, rods connected to said element, a device associated with said rods, spring means cooperating with said device, a split ring for each rod adapted to be positioned in one of a plurality of grooves on the respective rod, and cup-members mounted on said device and having their flanges around said rings.

14. In a clutch, the combination of driving and driven plates, a pressure disc at one side of said plates, a driven member at the other side of said plates, rods secured at one end to said pressure disc and projecting through apertures in the driven plate and driven member, a driven shaft carrying said driven member, a sheet metal ring, channel-shaped in cross section, through which said shaft projects, said ring being mounted upon and carried by the said rods independently of the driven shaft and spring means compressed between said ring driven member, and means adapted to engage the ends of said rods to force the ring inwardly against the pressure of the spring means.

15. In a clutch, the combination of a driven shaft, a driven member comprising a hub and a flange, means for securing said member to said shaft, a driving element, driving and driven plates, a pressure disc at one side of said plates, said flange being at the other side, rods secured at one end to said pressure disc and projecting through said flange and driven plate, a device mounted on the other end of said rods, a plurality of springs between said flange and device, and means for permitting removal and replacement of said driving and driven plates without necessitating disassembly of said driven member, shaft, securing means, device and springs from one another.

16. In a clutch, a driven shaft, a driven member on said shaft consisting of a hub and flange integral with each other, an annular pressure member mounted and guided on said driven member only and comprising a pressure disk and a plurality of operating rods extending through, and guided for rectilinear movement in bores in said driven member, driving and driven plates intermediate the pressure disk and the flange of the driven member, the driven plates guided on said rods, a driving member to which the driving plates are so keyed as to have axial movement relative thereto but to be rotated thereby, a ring to which said rods are secured at their ends, springs between said ring and driven member, and means for forcing said ring against the pressure of said springs, said last mentioned means exerting pressure upon the ends of said rods independently of said ring.

17. In a clutch, a driven shaft, a driven member on said shaft consisting of a hub and flange, an annular pressure member mounted and guided on said driven member only and comprising a pressure disk and a plurality of actuating rods extending through and guided for axial movement in bores in said driven member, driving and driven plates intermediate the pressure disk and the flange of the driven member, the driven plates mounted on said rods and driving the driven member therethrough, a driving member to which the driving plates are so keyed as to have axial movement relative thereto but to be rotated thereby, a ring surrounding the shaft mounted upon and guided by the actuating rods only, springs between said ring and the driven member, and means for forcing the ring inward against the pressure of said springs.

18. In a clutch, the combination of driving and driven plates, a pressure disc at one side of said plates, a driven member at the other side of said plates for driving the driven plates, rods secured at one end to said pressure disc and projecting through and supported by said driven member, a sheet metal ring having flanges at its edges and carried and guided solely by the other ends of said rods, and spring means compressed between said member and said ring.

19. In a clutch, the combination of a driving shaft and a driven shaft, driving and driven plates, a pressure disc at one side of said plates, a driven member at the other side of said plates and secured to said driven shaft, rods secured at one end to said pressure disc and projecting through and guided by bores in said driven member, a sheet metal ring secured to and carried solely by the other ends of said rods, a plurality of spaced depressed centering devices on said ring and correspondingly spaced centering devices on said member, and a plurality of springs compressed between said member and ring and having their ends cooperating with said centering devices.

20. In a clutch, a plurality of disk-shaped members normally in frictional engagement with each other for connecting a drive and a driven shaft, pins passing through and slidably supported by the outer of said members and having one end secured to the inner of said members, a member slidable along but out of contact with said driven shaft, said member being carried and aligned by the opposite ends of said pins, and means interposed between said outer member and said slidable member for resiliently holding said friction members in frictional engagement.

21. In a clutch, a plurality of disk-shaped members held normally in frictional engagement with each other for connecting a drive and a driven shaft, and control means for engaging and disengaging said members to engage and disengage said shafts comprising a member slidable along but out of contact with the driven shaft and secured to the inner of said members by a plurality of pins, said pins being slidably mounted in the other of said members, compression means carried between the said slidable member and said disk shaped members, and means for moving said slidable member toward said disk members in opposition to said compression means.

THOMAS L. FAWICK.